US007682235B2

(12) United States Patent  
Ferraris

(10) Patent No.: US 7,682,235 B2
(45) Date of Patent: Mar. 23, 2010

(54) THRESHING DEVICE FOR HARVESTING MACHINES

(76) Inventor: Omar Ruben Ferraris, Santiago del Estero 869, Partido de 9 de Julio, Buenos Aires (AR)

( * ) Notice: Subject to any disclaimer, the term of this patent is extended or adjusted under 35 U.S.C. 154(b) by 527 days.

(21) Appl. No.: 11/481,176

(22) Filed: Jul. 5, 2006

(65) Prior Publication Data

US 2007/0010304 A1    Jan. 11, 2007

(30) Foreign Application Priority Data

Jul. 7, 2005    (AR) ............................. P050102819

(51) Int. Cl.
*A01F 7/04*  (2006.01)
(52) U.S. Cl. ............................. 460/75; 460/76; 460/108
(58) Field of Classification Search ............ 460/73–78, 460/70, 107–110; 56/14.6, 122
See application file for complete search history.

(56) References Cited

U.S. PATENT DOCUMENTS 2,943,629  A  *  7/1960  Carruthers ................. 460/135
3,946,746  A  *  3/1976  Decoene et al. ............... 460/73
4,332,262  A  *  6/1982  De Busscher ................ 460/75
4,640,085  A  *  2/1987  Rupprecht .................. 56/14.6
4,696,151  A  *  9/1987  Hobbs ........................ 56/14.6

* cited by examiner

*Primary Examiner*—Alicia M Torres
(74) *Attorney, Agent, or Firm*—Defillo & Associates, Inc.; Evelyn A. Defillo

(57) ABSTRACT

A threshing device for harvesting machines having a cut front header for cutting plants to be harvested. The threshing device includes a feeder rotor, at least two threshing rotors, and a grille located underneath of the threshing rotors. The threshing rotors are placed adjacent to each other and only one is located adjacent to the feeder rotor. The feeder rotor feeds the plants to the threshing rotor nearest the feeder rotor. The grille runs continuously through all the threshing rotors and includes a plurality of waves parallel to each other and defining peaks and valleys. The valleys match the peaks of the adjacent waves. On each valley the corresponding threshing wheel is located.

9 Claims, 5 Drawing Sheets

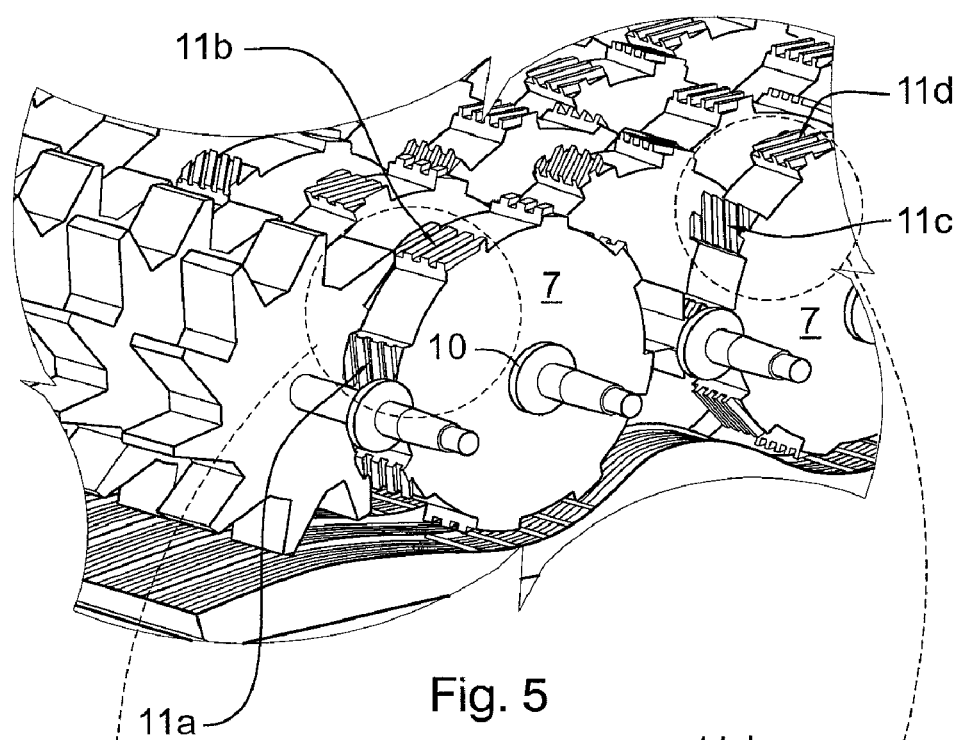
Fig. 5
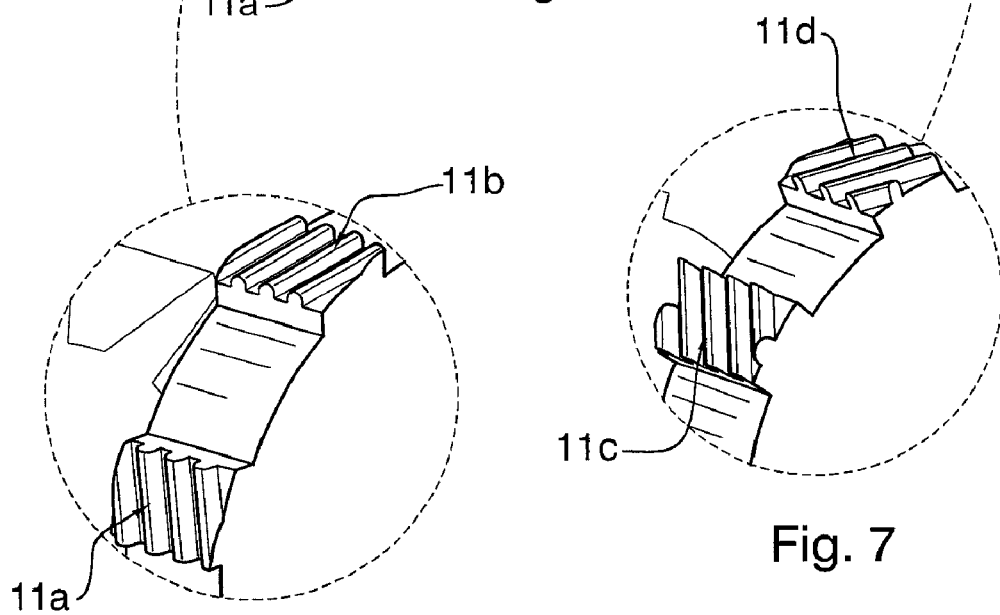
Fig. 6
Fig. 7

THRESHING DEVICE FOR HARVESTING MACHINES

FIELD OF THE INVENTION

The present invention relates to the agricultural field and more particularly refers to a threshing device for harvesting machines in general and preferably harvesting machines for cereals and oleaginous such as wheat, corn, rice, soybean or alike. This device is fit for its implementation in new harvesting machines while being manufactured, as well as for in-use harvesting machines, by means of simple adjustments thereof.

DESCRIPTION OF THE PRIOR ART

Conventional harvesting machines known so far include a variety of threshing devices acting in different manners according to the kind of crop to be harvested. The most traditional systems are those provided of a single rotor with mixers, operating on a concave grille or bed with counter-mixers, crossly located on the machine; the so called axial systems located alongside the machine; and the threshing systems which entail a combination of the former ones. These conventional threshing devices must meet several structural and functional features according to the variety, maturity shape, size and genetics of cereals and oleaginous to harvest, also considering climate conditions during the harvest period among other variables to take into account. Because of the abovementioned conditions, current threshing devices have a though process to achieve, which is not effectively accomplished as originally created. Therefore major inevitable losses of grain and working hours take place.

Those harvest machines including one or several cross rotors, such as a feeder or deliverer rotor, a threshing rotor and a winnower rotor or trashing rotor, when all of them work on concave grilles with counter-mixers a very fast, violent, non-uniform and of high inertia threshing takes place. This process centrifuges the waste material and grains avoiding the normal filtering and provoking jamming. At the same time the breaking or fractioning of grains takes place, and according to the conditions of the material to be processed, it becomes impossible to split grains from their respective sheaths or spikes. These are the main grounds for losses caused in this type of harvesting machines in their threshing system by means of the straw filtering and sieves.

Harvest machines including one or two axial cylinders, have mixers set as hairsprings working on grilles set up differently, provided with counter-mixers, with a "sky" with deflecting fans that guide the transportation of disposal material and grains towards the rear exit. This device, compared with the former one, improves the treatment of grains, avoiding part of the breaking, but effectiveness or performance capacity diminish when crops growing and grains thereof are not mature enough or when the weather is humid, consequently the processed product is wrapped, and its conveyance stopped due to the great rubbing on the "sky" fans. All of the abovementioned means a higher demand of engine power, consumption of contaminant fuels, a considerable loss of threshing capacity, excessive wearing out, jamming, breakages and grain losses.

Harvest machines including a combination of the two above mentioned systems, have a cross rotor, where deliver of crop is on the front part, the first one third of its width acts as a conventional rotor with the same aggressiveness, and on the remaining two thirds of the rotor the same problems of the axial system show up. Consequently, this alternative has the same flaws and disadvantages than the systems mentioned in first place.

Summing it all up, all conventional systems known so far act in a very violent, aggressive and unequal way over the sheaths or spikes in order to thresh them. Thus, the grains are expelled at a very high speed against the concave grilles and the counter-mixers thereof, provoking breakage, fracture or rupture, losing their industrial quality and germinative capacity when the former are meant for seeds. Therefore, providing with a high processing capacity, low power consumption and better treatment of grains threshing device becomes necessary, in order to enhance the capacity and productivity of harvest machines and improving harvest quality. All of these features, together with other major advantages are accomplished with the threshing device object of this invention

SUMMARY OF THE INVENTION

Threshing device for harvesting machines of the type including a feeder for cut plants, oriented towards a succession of rotors that mix and convey said cut plants splitting grains from straw, stems or spikes; and a flat or longitudinal wave grille whereby grains are conveyed for gathering thereof. Each rotor is conformed by a manifold of threshing wheels jointly connected to the shaft of the rotor and laterally separated form each other. The threshing wheels of one rotor are located in an intercalated way to the threshing wheels of the adjacent rotor, in such a way that one threshing wheel of a rotor is partially set up between two threshing wheels of the adjacent rotor. Each threshing wheel is provided with perimetral projections that define mixers of the cut plants. Mixers are integrated by groups of teeth distributed at the same distance along the threshing wheels perimeter surface. Teeth of each mixer are longitudinally bent as regards the rotation sense of the corresponding rotor and angularly bent in the opposed sense to the adjacent mixer teeth. With the wave grille conforming alternate peaks and valleys between adjacent waves, above each valley the pertaining threshing wheel is located.

BRIEF DESCRIPTION OF THE DRAWINGS

Although the invention will be described with reference to specific embodiment of threshing device, workers skilled in the art will recognize that changes can be made in form and detail without departing from the spirit and scope of the invention, which is defined by the appended claims.

FIG. 5 is a detailed view of the threshing device of FIG. 3 showing that the group of projections of the rotor adjacent to the feeder rotor has group of projections (teeth) wider than the group of projections of the subsequent rotors.

FIG. 6 is a closed view of the group of projections (teeth) of the threshing wheel showing that the group of projections is bent in an angularly opposite sense regarding the adjacent group of projections.

FIG. 7 is a detailed view of the threshing device of FIG. 3 showing the details of the teeth of the threshing wheel.

DETAILED DESCRIPTION OF THE INVENTION

Figure 1:
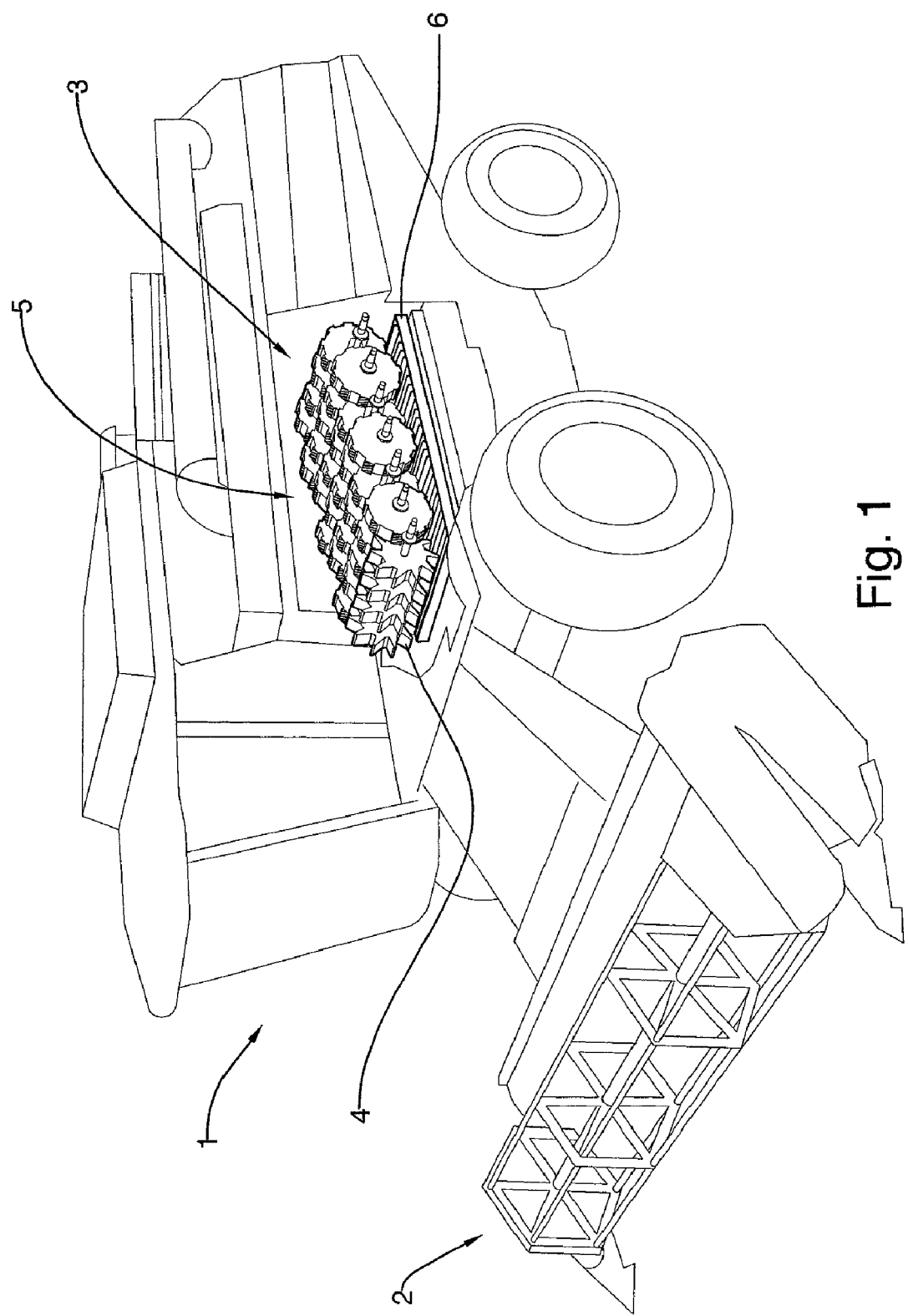
FIG. 1 schematically shows a partially cut perspective view of a harvesting machine where the threshing device has been incorporated.

FIG. 1 shows a harvesting machine 1, having a cut front platform or header 2, of the plants to be harvested, and the threshing device 3 of this invention incorporated to said harvesting machine 1. The threshing device 3 includes a feeding rotor 4 by means of which those plants cut by the header 2 are fed to a succession of threshing rotors 5 to mix and convey the cut plants along the device, splitting grains from straw, stems or sheaths in combination with a flat grille 6 located underneath the rotors 5. Said feeder 4 includes a pair of ratchet teeth 9 which produce the delivery of material in low revolutions, not aggressively but with high conveyance capacity to successive rows of threshing wheels located in rotors 5.

Figure 2:
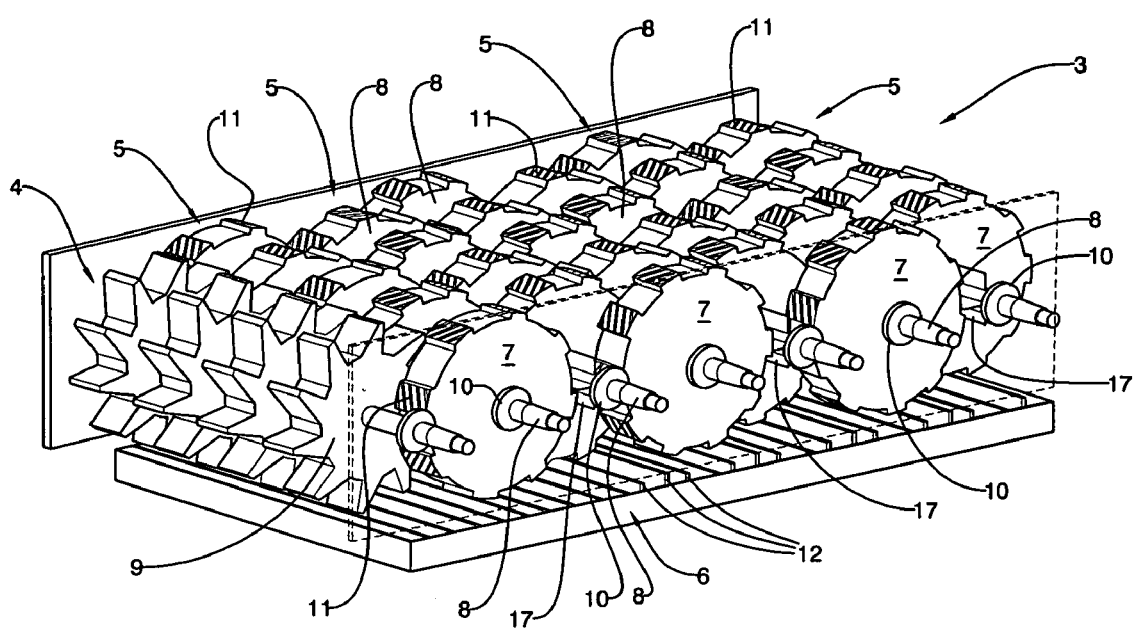
FIG. 2 is a perspective view of the threshing device where the assembly of rotors can be appreciated on a flat grille which splits grains in pursuance with one of the invention's accomplishments.

FIG. 2 shows the clearest view to appreciate that each one of the rotors 5 is conformed by a manifold of threshing wheels 7, connected to the shaft 8 of the corresponding rotor 5, laterally separated each other and intercalated with the threshing wheels 7 of the adjacent rotor 5, rear and/or front. This way, each threshing wheel 7 of a rotor 5 is partially set between two threshing wheels 7 from the adjacent rotor or rotors 5. Similarly, each of the wheels 9 of the feeder 4, "star shaped" gear wheels 7, are intercalated between the pertaining pairs of threshing wheels 7. Shafts 8 of rotors 5 include radial fans 17 acting as cleaners or straw splitters of the threshing wheels 7 of each rotor 5 ahead. Rotors 4 and 5 are coupled to the harvesting machine structure 1 from their respective axis by means of the corresponding bearings 10.

Plants cut by Header 2 are taken by the gear wheels of the feeder 4 that convey the material towards the rotors 5 and, when accessing the area of the threshing wheels 7, are simultaneously scrolled and softly mixed in a way to split straw, spikes or stems from the gathered seeds or grains. Since all rotors 5 turn in the same directions, in the interleave area between the wheels 7 of adjacent rotors, the side surfaces faced of the wheels move in opposite directions. This avoids the material from being inadequately shaken or impelled upwards, as it happens in conventional machines. The separation distance between the side faces of the interleaved wheels is the minimum and enough one to avoid rubbing thereof and, besides, this is a way to accomplish the non accumulation of material amongst the adjacent wheels.

Threshing wheels 7 include perimetral projections 11a, 11b, 11c, 11d that define mixers 11 of the cutoff plants, made by groups of teeth equally distant distributed over the perimetral surface of the corresponding threshing wheel, parallel to each other and longitudinally bent as regards the turning sense of the pertaining rotor 5. Said mixers 11, combined with the grille 6 provided with counter-mixers 12, produce the threshing of the cut plants. In each threshing wheel 7, said group of projections (teeth) 11a, 11c are bent in an angularly opposite sense regarding the adjacent group of projections 11b, 11d, on the rotor. At least in the first rotor, or front rotor, preferably group of projections (teeth) 11a, 11b of the mixers 11 have a width or thickness greater than the group of projections (teeth) 11c, 11d of mixers 11 of rotors 5 subsequent to the previous. Alternate bent of Mixers' 11 teeth and the different thickness of said teeth facilitate the mixing and split of grains coming from plants with different grain size, removing the material in a swaying way towards one side and another during their shifting along the device. More in particular, the widest teeth turn out to be more adequate for the mixing of gross grain plants, such as corn and soybean, whereas the narrowest teeth happen to be more adequate for the mixing of fine grain plants, such as wheat.

The threshing wheels 7 are interspersed, and the product to be threshed is conveyed from the front row of threshing wheels towards the rear lines of threshing wheels. Each line of wheels 7 cleans or relieves those located ahead of it, thus a permanent flow is accomplished in the threshing and straining process. That is to say that the array of interspersed threshing wheels 7 saves the generation of extreme forces during the threshing process, as it happens in conventional harvesting machines where crops jams and damages take place. Instead, a soft and progressive threshing is accomplished with the device hereunder, along the grille 6.

The number and constructive specifications of rotors 5 and threshing wheels 7 shall be according to the most convenient practice based on the operative needs and fittest requirements for the different types of crops to be harvested. It is important to highlight that the threshing wheels 7 of each rotor are basically alike, therefore manufacturing, installation cost and eventual maintenance works that should be made, are significantly lower than in the case of conventional machines. Operative costs of harvesting machines are also lower since this is a multiple use device, i.e. the same is fit for crops of plants with different size grains not having to change the rotors or mixers.

The flat conformation of the grille 6 avoids the centrifuge effect of the threshing wheels 7, when the latter rotate, since the same are interspersed. Instead a slow and smooth horizontal conveyance of grains takes place on that grille 6, thus allowing a higher time of gravitational sieving at the moment when sheaths or spikes are split during the threshing process. In other words, on one hand grains are transported slowly for a longer straining time, and on the other hand, straws, sticks and/or spikes travel faster and more nimbly, all of which turns in pro of the split process. This grille 6 is very appropriate for harvesting of cereals not requiring of a high threshing capacity, such as corn.

Figure 3:
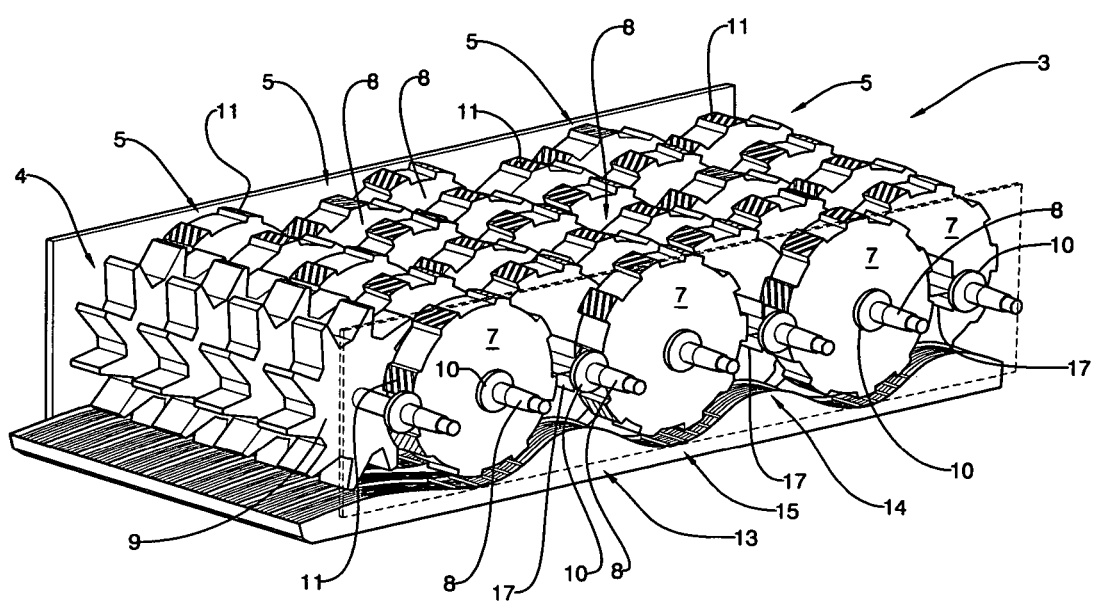
FIG. 3 is a perspective view of the threshing device where a group of rotors appear arranged on a waved grille splitting grain in pursuance with another accomplishment of this invention.
Figure 4:
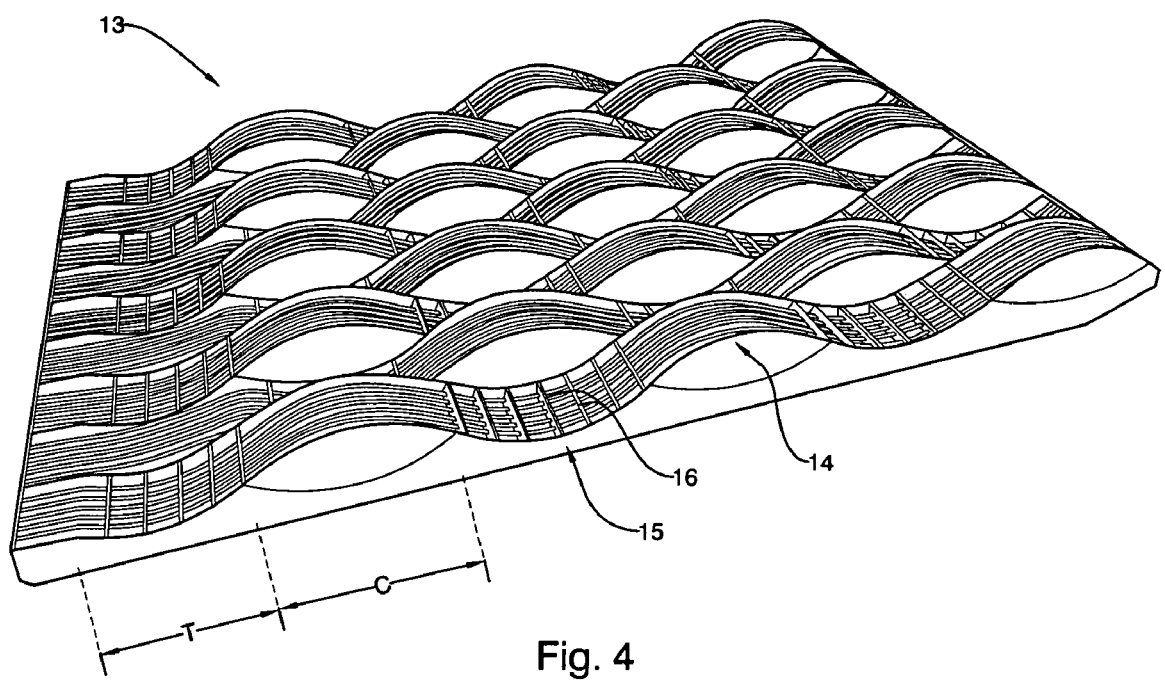
FIG. 4 is a perspective view of the waved grille as illustrated in FIG. 3.

In another embodiment according with FIG. 3, it is shown that the set of rotors 5 together with the feeder 4 are assembled on a wave grille 13, which shows a plurality of longitudinal waves parallel to each other that define peaks 14 and valleys 15, alternately conformed amongst the adjacent waves. On each valley 15 the corresponding threshing wheel 7 is located. Grille 13 includes counter-mixers 16, equivalent to the counter-mixers 12 of the flat grille 6 but operatively adequate to the combination of rotors 5 with the waved conformation of grille 13. Besides, unlike the former one and as shown in FIG. 4, the waved grille 13 presents a big surface where an initial threshing and sieving T zone and a C Zone of final sieving are defined, thus achieving an effective split of grains from their respective sheaths or spikes and also accomplishing an improved gravitational sieving avoiding straining by high centrifugation.

Interaction between the threshing wheels 7 and the waved grille 13 is more energetic than in the event of the former make with the flat grille 6, and since alternate waves appear, the device according to this combination is appropriate for all kind of crops where plant stems need to be crushed, especially in those plants highly resistant to threshing, such as soybean crops. Therefore, unlike conventional machines, use of crushers is not necessary, since the latter require of a considerable engine power. Consequently, in this waved grille threshing device 13 with alternate waves forming peaks 14 and valleys 15, combined with threshing wheels 7 interspersed each other, allows with a very low consumption of energy, the effective crushing of plant's stems and sticks in general of those plants whose borders are trapped against pairs of waves that rise before the latter along the grille.

Both types of grilles, flat and waved, can be regulated both in distance as well as angularly, as regards the set of rotors that define the lines of interspersed threshing wheels, enabling the adjustment of different gaps on each group of wheels thus achieving a more effective threshing and splitting for different crops under different environmental conditions.

For all the above said, this threshing device for cereal and oleaginous harvesting machines allows the achievement of a great work capacity and performance with low work revolutions, less fuel and energy consumption, with a higher operation reliability since it is simpler than the conventional ones, it improves treatment of grains significantly reducing the breakage thereof since grain removal is not produced by means of aggressive and hitting rubbing, avoiding damages and breakages or ruptures thereof, thus enhancing productivity of the crop. Work in this threshing device is progressive, non violent nor aggressive, and there is no need to use straw removers, like in the conventional systems. Besides, since this is a threshing device of small dimensions, both in height and length, its lesser height allows the harvesting machine to count with a greater storage capacity for grains, and for its lesser length it enables counting with greater space for the location of the machine propelling mechanisms and of the harvesting devices, that in some other cases are driven by means of speed changes and their respective chains and belts. It is also important to mention that because of this device's small sizes, harvesting machines get a significant space off that now shall enable a more adequate location of the cabin and arranging of a storage fit to contain a greater volume of harvested grains. This is a major advantage since use of a support cart or tractor is not necessary, nor stopping many times to unload grains as with conventional machines, considerably avoiding excessive trampling of the field due to the transit of machines and vehicles, being this feature very important in today's farming systems.

I claim:

1. A threshing device for harvesting machines, the harvesting machine having a cut front header for cutting plants to be harvested, the threshing device comprising:
    a feeder rotor, wherein the cut front header conveys the cut plants to the feeder rotor;
    at least two threshing rotors, wherein the threshing rotors are placed adjacent to each other and only one is located adjacent to the feeder rotor, wherein the feeder rotor feeds the plants to the threshing rotor nearest the feeder rotor, wherein all threshing rotors turn in the same direction;
    wherein each threshing rotor comprises:
    a shaft;
    a manifold of threshing wheels;
    wherein each threshing wheel is connected to the shaft of the corresponding rotor;
    wherein the threshing wheels are laterally separated from each other;
    wherein each threshing wheel is intercalate between the wheels of the adjacent threshing rotor; and
    a grille located underneath of the threshing rotors, wherein the grille runs continuously through all the threshing rotors and includes a plurality of waves parallel to each other and defining peaks and valleys, wherein the valleys match the peaks of the adjacent waves, wherein on each valley the corresponding threshing wheel is located.

2. The threshing device of claim 1 wherein each one of the wheels of the threshing rotor comprises a group of projections of equal distance distributed over the perimeter of the wheel, wherein the group of projections define a mixer.

3. The threshing device of claim 2 wherein the projections are teeth.

4. The threshing device of claim 1 wherein the feeder rotor includes a plurality of star shaped wheels, wherein the wheels of the feeder rotor are intercalate between the wheels of the threshing rotor adjacent to the feeder rotor.

5. The threshing device of claim 1 wherein the shafts of the threshing rotors further include radial fans to clean the wheels of the threshing rotors.

6. A threshing device for harvesting machines, the harvesting machine having a cut front header for cutting plants to be harvested, the threshing device comprising:
    a feeder rotor, wherein the cut front header conveys the cut plants to the feeder rotor;
    at least two threshing rotors, wherein the threshing rotors are placed adjacent to each other and only one is located adjacent to the feeder rotor, wherein the feeder rotor feeds the plants to the threshing rotor nearest the feeder rotor, wherein all threshing rotors turn in the same direction;
    wherein each threshing rotor comprises:
    a shaft;
    a manifold of threshing wheels;
    wherein each threshing wheel is connected to the shaft of the corresponding rotor;
    wherein the threshing wheels are laterally separated from each other;
    wherein each threshing wheel is intercalate between the wheels of the adjacent threshing rotor;
    wherein each one of the wheels of the threshing rotor comprises groups of projections of equal distance distributed over the perimeter of the wheel, wherein each group of projections define a mixer;
    wherein the groups of projections are parallel to each other and longitudinally bent with regards to the turning sense of the corresponding threshing rotor; and
    a grille located underneath of the threshing rotors, wherein the grille runs continuously through all the threshing rotors and includes a plurality of waves parallel to each other and defining peaks and valleys, wherein the valleys match the peaks of the adjacent waves, wherein on each valley the corresponding threshing wheel is located.

7. A threshing device for harvesting machines, the harvesting machine having a cut front header for cutting plants to be harvested, the threshing device comprising:
    a feeder rotor, wherein the cut front header conveys the cut plants to the feeder rotor;
    at least two threshing rotors, wherein the threshing rotors are placed adjacent to each other and only one is located adjacent to the feeder rotor, wherein the feeder rotor feeds the plants to the threshing rotor nearest the feeder rotor, wherein all threshing rotors turn in the same direction;
    wherein each threshing rotor comprises:
    a shaft;
    a manifold of threshing wheels;
    wherein each threshing wheel is connected to the shaft of the corresponding rotor;
    wherein the threshing wheels are laterally separated from each other;
    wherein each threshing wheel is intercalate between the wheels of the adjacent threshing rotor;
    wherein each one of the wheels of the threshing rotor comprises groups of projections of equal distance distributed over the perimeter of the wheel, wherein each group of projections define a mixer;

wherein each one of the groups of projections of each threshing wheel are bent in an angularly opposite sense to the group of projections of the adjacent groups of projections on the threshing rotor; and a grille located underneath of the threshing rotors, wherein the grille runs continuously through all the threshing rotors and includes a plurality of waves parallel to each other and defining peaks and valleys, wherein the valleys match the peaks of the adjacent waves, wherein on each valley the corresponding threshing wheel is located.

8. A threshing device for harvesting machines, the harvesting machine having a cut front header for cutting plants to be harvested, the threshing device comprising:

a feeder rotor, wherein the cut front header conveys the cut plants to the feeder rotor;

at least two threshing rotors, wherein the threshing rotors are placed adjacent to each other and only one is located adjacent to the feeder rotor, wherein the feeder rotor feeds the plants to the threshing rotor nearest the feeder rotor, wherein all threshing rotors turn in the same direction;

wherein each threshing rotor comprises:

a shaft;

a manifold of threshing wheels;

wherein each threshing wheel is connected to the shaft of the corresponding rotor;

wherein the threshing wheels are laterally separated from each other;

wherein each wheel is intercalate between the wheels of the adjacent threshing rotor;

wherein each one of the wheels of the threshing rotor comprises groups of projections of equal distance distributed over the perimeter of the wheel, wherein each group of projections define a mixer;

wherein each group of projections of the threshing rotor adjacent to the feeder rotor are wider than the group of projections of the subsequent threshing rotor; and a grille located underneath of the threshing rotors, wherein the grille runs continuously through all the threshing rotors and includes a plurality of waves parallel to each other and defining peaks and valleys, wherein the valleys match the peaks of the adjacent waves, wherein on each valley the corresponding threshing wheel is located.

9. A threshing device for harvesting machines, the harvesting machine having a cut front header for cutting plants to be harvested, the threshing device comprising:

a feeder rotor, wherein the cut front header conveys the cut plants to the feeder rotor;

at least two threshing rotors, wherein the threshing rotors are placed adjacent to each other and only one is located adjacent to the feeder rotor, wherein the feeder rotor feeds the plants to the threshing rotor nearest the feeder rotor, wherein all threshing rotors turn in the same direction;

wherein each one of the wheels of the threshing rotor comprises groups of projections of equal distance distributed over the perimeter of the wheel, wherein the each group of projections define a mixer;

wherein the mixer is made by groups of teeth;

wherein each threshing rotor comprises:

a shaft;

a manifold of threshing wheels;

wherein each threshing wheel is connected to the shaft of the corresponding rotor;

wherein the threshing wheels are laterally separated from each other;

wherein each wheel is intercalate between the wheels of the adjacent threshing rotor;

wherein the grille further includes counter-mixers and splitting bars; and a grille located underneath of the threshing rotors, wherein the grille runs continuously through all the threshing rotors and includes a plurality of waves parallel to each other and defining peaks and valleys, wherein the valleys match the peaks of the adjacent waves, wherein on each valley the corresponding threshing wheel is located.

\* \* \* \* \*